Patented Aug. 18, 1953

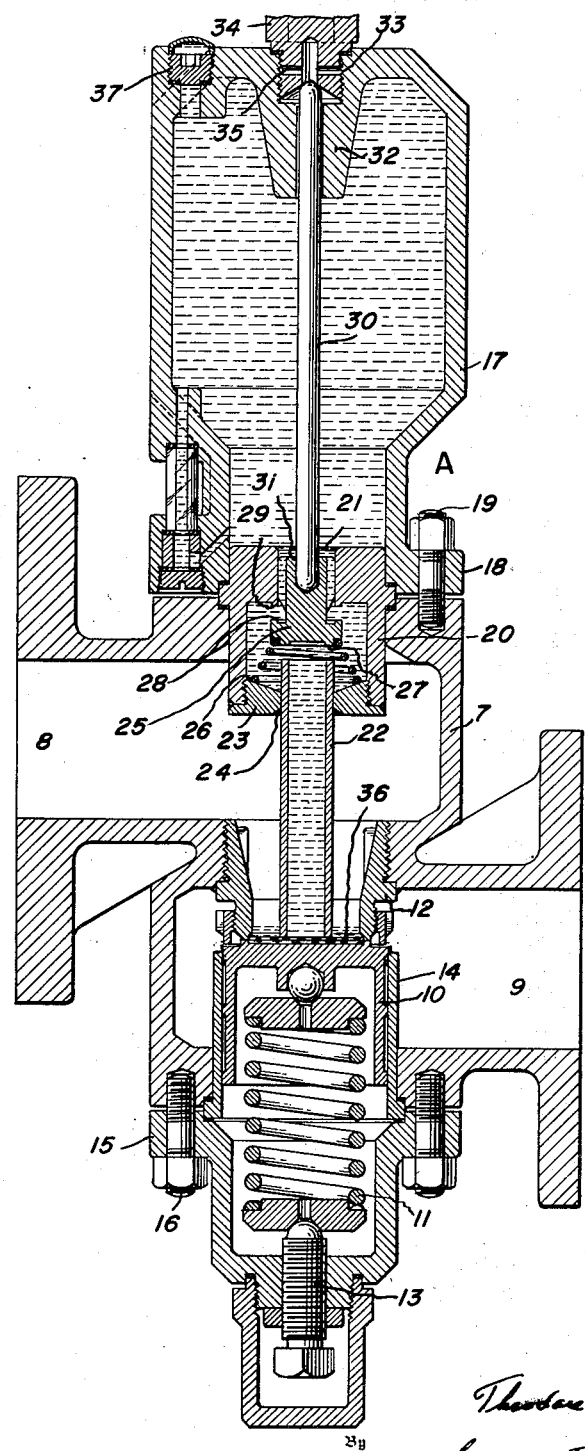

2,649,110

UNITED STATES PATENT OFFICE 2,649,110

ART OF SEALING THE SEATING SURFACES OF VALVES AND SIMILAR DEVICES

Theodore W. Bergquist, Willow Grove, Pa.

Application December 17, 1948, Serial No. 65,756

13 Claims. (Cl. 137—246)

This invention relates to the art of providing a liquid seal for the seating surfaces of valves and similar devices for handling gases and vapors under pressure.

The invention will be described in connection with relief valves, but it is to be understood that it is equally applicable to any type of valve mechanism wherein it is desirable to provide a liquid seal to prevent leakage. The invention is especially useful where the valve seats with a metal-to-metal contact of the seating surfaces.

One of the primary objects of the invention is to provide a device in which a bath of sealing liquid is automatically formed and reformed after every operation of the valve.

Another object of the invention is to reduce to a minimum the wastage of sealing liquid.

More particularly, it is an object of the invention to provide a very simple, inexpensive but effective apparatus for automatically forming a sealing bath for valve mechanisms.

How the foregoing, together with such other objects and advantages as may hereinafter appear, are realized is illustrated in the accompanying drawing, which is a vertical section through the preferred embodiment of my invention.

Referring now to the drawing, the reference numeral 7 indicates the valve body having an inlet 8 for the gas or vapor under pressure and an outlet 9. The body is flanged for attachment. The reference numeral 10 indicates the main valve proper. This valve is loaded. In the particular embodiment shown, the valve is loaded by the spring 11 which normally tends to hold the valve against the seat member 12. The valve seats thereagainst with metal-to-metal contact. The pressure of the spring 11 may be adjusted by the tension adjusting screw 13. The valve 10 is mounted within the valve sleeve 14, which in turn is mounted in the body 7 through the medium of the flanged cap member 15 and the studs 16.

Associated with the body 7 is a container indicated as a whole by the reference letter A for containing the liquid sealing medium employed. This sealing medium may be oil or any other sealing medium suitable for or compatible with the particular gases or vapors to be handled.

The container comprises the main body portion 17 flanged as indicated at 18 for attachment to the valve body 7 as by means of the studs 19. Housed within the container body 17 and the valve body 7, and clamped therebetween, is a shouldered thimble 20 having an opening 21 in its upper wall.

Extending into said thimble is a tubular member 22 of relatively small cross sectional dimension so as to have relatively small capacity. This tubular member is held in place by means of the threaded or nut-like member 23. The member 23 is threaded into the lower end of the thimble 20 and the tubular member 22 is secured to the member 23, as by the welding indicated at 24. The upper end of the tubular member 22 opens into the interior of the thimble 20 and is thus normally in communication with the interior of the body 17 through the opening 21 in the top of the thimble. The lower end of the tubular member 22 terminates just short of the seating line between the valve and the seat member 12. Thus the tubular member is also capable of communication with the gas or vapor entering the valve body 7 at the inlet 8.

A loaded check valve 25, in this instance spring loaded by the spring 26, is mounted in the thimble 20. This check valve is desirably although not necessarily double acting, having a lower seating face 27 adapted to seat against the top of the tubular member 22, and an upper seating face 28 adapted to seat on the seating face 29 of the thimble.

The check valve 25 is normally held in neutral position, as shown in the figure, by means of the positioning rod 30 and the spring 26, the lower end of which rod is slidably fitted in the recess 31 in the top of the valve and bottoms therein. The upper end of the positioning rod extends into the apertured boss 32 of the container body 17. This boss is provided with an internally threaded recess 33 into which the upper end of the positioning rod extends. A plug 34 is threaded into the recess 33 and is provided with an escape port 35 normally covered when the plug 34 is screwed home.

The operation is as follows: The container is filled with sealing liquid as will hereinafter be described, and the valve 10 is held to its seat by the spring 11 adjusted to the desired tension by the tension screw 13. As pressure in the inlet passage 8 increases, a bubbling of gas or vapor into the lower end or mouth of the tube 22 takes place and the gas or vapor entering the tube passes upwardly into the interior of the thimble 20, thence into the interior of the body 17 through the opening 21 at the top of the body 17. The sealing liquid is thus forced downwardly from the container and out the lower end of the tubular member 22 until there is a bath of sealing liquid 36 built up on top of the valve 10 to a point completely covering the mouth of the tubular member. The gas pressure above the liquid in the container body 17, plus the hydraulic head of the liquid above the mouth of the tubular member, balances the static pressure head in the inlet passage 8. When equilibrium is thus established, bubbling ceases and the bath remains at constant level.

When the pressure in the inlet pasage 8 exceeds the spring load on the valve 10, the valve opens and the gas or vapor, as the case may be, escapes to the outlet 9. As the gas or vapor is thus released, the hydraulic surge from the container and the differential in pressure cause the check valve 25 to seat against the upper end of the tubular member 22, thus conserving the liquid in the container body 17. Of course, upon the opening of the valve the liquid of the bath is lost and the liquid in the tube 22 may be lost, the extent of the loss thereof being dependent upon the length of time that the main valve 10 is open. As the over-pressure in the inlet passage 8 is practically instantaneously relieved, all of the liquid in the tubular member 22 may not be lost.

As soon as the over-pressure has been relieved, the spring 11 forces the main valve back onto its seat and the check valve returns to its normally open position. The static pressure in the inlet passage 8 returns to normal, bubbling of gas or vapor into the tube 22 and into the container body 17 again occurs, and liquid is again displaced in sufficient quantity to form the sealing bath, preventing further bubbling.

In the manner thus described, a shallow level of liquid can be maintained above the main valve through numerous operating cycles of the valve until such time as the liquid supply in the container has been exhausted. This bath seals any imperfections between the seating surfaces and very effectively prevents any leakage through the main valve.

It is of course necessary from time to time to refill the container 17. This is accomplished in the following manner.

The plug 34 is backed off and the check valve 25, under the influence of spring 26, moves upwardly to close off the opening 21. When the plug is backed off, the port 35 is uncovered and the container can be filled by removing the filling plug 37. Any air or gas or vapor in the container body 17 escapes through the exhaust port 35, in consequence of which the container can be completely filled. When it is filled, the plug 34 is again screwed home and the rod 30 will then have positioned the check valve 25 in neutral position.

Because the check valve 25 is slidable downward on the lower end of the positioning rod 30, the valve can readily seat on the top end of the tubular member 22 as hereinbefore described, upon the opening of valve 10.

The invention is particularly useful in plants where gases or vapors such as oxygen, nitrogen, and the like are stored in bottles, tanks or other containers under pressure. During overnight shut-downs and the like, when the pressure pumps are not operating, there is no loss of gas or vapor because of the effective seal maintained.

As hereinbefore indicated, the invention is not limited to relief valves but may be used in connection with any valve mechanism where it is desirable and where the construction is such as to make it possible to provide a bath of sealing liquid for the valve. In this connection, it is of course to be understood that the mechanism may occupy any position so long as a bath will accumulate adjacent to and cover at least a substantial portion of the seating surfaces.

For the purposes of this invention the tubular member 22, the thimble 20, and the body 17 may be considered as a container. I have used the term "metal-to-metal" seating with respect to the main valve. As valves and valve parts are not always made of metal, this is to be understood in a broad sense as meaning that its parts seat against each other without the interposition of soft sealing gaskets, washers, and the like on which reliance is placed for its seal.

I claim:

1. In valve mechanism for handling gases and vapors under pressure having a main valve and having a seat member providing a metal-to-metal seat for the valve, the combination of a source of supply of a liquid sealing medium, and an upstanding tubular member communicating at one end with said source and having at the other end an opening adjacent to the line of the valve seat on the pressure side of the valve, said seat member surrounding said other end of the tubular member and cooperating with the valve when closed to form an upstanding cup-like structure adapted to contain liquid sealing medium flowing from said source of supply and the lower end of said tubular member terminating short of the upper face of the valve, whereby the gas or vapor may enter into said source and sealing liquid may flow by gravity from the source to form a sealing bath for the seat and cover said opening.

2. The valve mechanism of claim 1 characterized by that the said tubular member is of small capacity relative to that of the container.

3. In valve mechanism for handling gases and vapors under pressure, a valve body having a valve seat, a main relief valve loaded against said pressure and having a metal-to-metal contact with said seat, a container for a liquid sealing medium associated with said body, an upstanding tubular member within said body normally in communication at its upper end with said container and having an opening at its lower end adjacent to the line of seating of said valve on the pressure side of the valve, said valve seat surrounding the lower end of the tubular member and cooperating with the main valve when closed to form an upstanding cup-like structure adapted to contain liquid sealing medium flowing from said container and the lower end of said tubular member terminating short of the upper face of the main valve, whereby the gas or vapor may enter into said container and sealing liquid may flow therefrom by gravity to form a sealing bath for the seat and cover said opening, and a check valve biased by loading means to maintain communication between the container and the tubular member and responsive to pressure in said container for shutting off flow from the container to the tubular member when the main valve is open and responsive to the loading imposed for re-establishing said communication between the container and the tubular member when the main valve is closed.

4. Valve mechanism for handling gases and vapors under pressure having a main valve and having a seat member providing a metal-to-metal seat for the valve, a combination of a source of supply of a liquid sealing medium, and an upstanding tubular member communicating at one end with said source and having at the other end an opening adjacent to the line of the valve seat on the pressure side of the valve, said seat member surrounding said other end of the tubular member and cooperating with the valve when closed to form an upstanding upright structure adapted to contain liquid sealing medium flowing from said source of supply, and the lower end of said tubular member terminating short of the upper face of the valve, whereby the gas or vapor may enter into said source and sealing liquid may flow by gravity from the source to form a sealing bath for the seat and cover said opening, said mechanism further having a check valve interposed between said tubular member and said source with means biasing it toward a position to maintain communication between said source and said tubular member and movable under the influence of pressure in said source to cut off communication between said source and said tubular member when the main valve opens, said check valve being double acting and being provided with a seat on each face, and said mechanism still further having a movable positioning member normally holding said check valve in neutral position and a removable member provided for the container for positioning said positioning member.

5. Valve mechanism according to claim 4 wherein said removable member is provided with an exhaust passage normally covered when said movable member is in positioning position.

6. Valve mechanism according to claim 5 wherein said removable member is in the form of a plug threaded into said container.

7. Valve mechanism for handling gases and vapors under pressure having a main valve and having a seat member providing a metal-to-metal seat for the valve, a combination of a source of supply of a liquid sealing medium, and an upstanding tubular member communicating at one end with said source and having at the other end an opening adjacent to the line of the valve seat on the pressure side of the valve, said seat member surrounding said other end of the tubular member and cooperating with the valve when closed to form an upstanding upright structure adapted to contain liquid sealing medium flowing from said source of supply, and the lower end of said tubular member terminating short of the upper face of the valve, whereby the gas or vapor may enter into said source and sealing liquid may flow by gravity from the source to form a sealing bath for the seat and cover said opening, said mechanism further having a check valve interposed between said tubular member and said source with means biasing it toward a position to maintain communication between said source and said tubular member and movable under the influence of pressure in said source to cut off communication between said source and said tubular member when the main valve opens, said check valve being double acting and being provided with a seat on each face, and said mechanism still further having a positioning rod engaging said check valve at one end for normally positioning the valve in neutral position and said container having a plug threaded into it for engaging the other end of said rod.

8. Valve mechanism according to claim 7 wherein said rod slideably engages with said check valve for movement of the valve in one direction.

9. In valve mechanism for handling gases and vapors under pressure, the combination of a valve and its body, a seat member for the valve providing a metal-to-metal seat, a container for a liquid sealing medium associated with and extending into the valve body to a point adjacent to the seating line of the valve on the pressure side thereof but short of the valve face and having an opening at said point, said container being normally closed save for said opening adjacent to the said seating line, said seat member cooperating with the valve when closed to form an upstanding cup-like structure adapted to contain a liquid sealing medium flowing from said container, whereby the gas and vapor may enter into said container and sealing liquid therefrom may form a sealing bath at the valve seat.

10. In valve mechanism for handling gases and vapors under pressure, the combination of a valve and its body, a seat member for the valve providing a metal-to-metal seat, a container for a liquid sealing medium associated with and extending into the valve body to a point adjacent to the seating line of the valve on the pressure side thereof but short of the valve face and having an opening at said point, said container being normally closed save for said opening adjacent to the said seating line, said seat member cooperating with the valve when closed to form an upstanding cup-like structure surrounding said container where it is provided with said opening and adapted to contain a liquid sealing medium flowing from said container, whereby the gas and vapor may enter into said container and sealing liquid therefrom may form a sealing bath at the valve seat, the portion of the container provided with said opening having a capacity constituting a minor fraction of the capacity of the container as a whole.

11. In valve mechanism for handling gases and vapors under pressure, the combination of a valve body and a relief valve, a valve seat, said valve having a metal-to-metal seat therewith, and a container for a liquid sealing medium associated with said valve body and having an open ended upstanding tubular member extending into the valve body and terminating at said end just short of the face of the valve and communicating with the interior of the container at the other end, said container being otherwise closed said valve seat cooperating with the valve when the valve is closed to form an upstanding cup-like structure adapted to contain a liquid sealing medium flowing from the container, whereby the gas or vapor may enter into the container and sealing liquid may flow therefrom by gravity to form a sealing bath for the seat and cover said opening.

12. Valve mechanism according to claim 1, further having a check valve interposed between said tubular member and said source with loading means biasing it in a direction to maintain communication between said source and said tubular member, said check valve further being movable under the influence of pressure in said source to cut off communication between said source and said tubular member when the main valve opens.

13. Valve mechanism according to claim 12 characterized in that the check valve is a double acting valve, movable from a mid-position to either of two extreme positions, and acting in either of said extreme positions to cut off communication between said source and said tubular member.

T. W. BERGQUIST.

References Cited in the file of this patent

UNITED STATES PATENTS

| Number | Name | Date |
|---|---|---|
| 1,266,509 | McKee | May 14, 1918 |
| 1,362,535 | Hughes | Dec. 14, 1920 |
| 1,776,077 | Messer | Sept. 16, 1930 |
| 1,926,373 | Denk | Sept. 12, 1933 |
| 2,371,961 | Ellis | Mar. 20, 1945 |